United States Patent
Lee et al.

(10) Patent No.: US 10,532,768 B2
(45) Date of Patent: Jan. 14, 2020

(54) METHOD FOR CONTROLLING POSITION OF VEHICLE

(71) Applicant: Hyundai Motor Company, Seoul (KR)

(72) Inventors: Kyung Bok Lee, Hwaseong-si (KR); Suk Jin Ko, Gwacheon-si (KR); O Sung Kwon, Yongin-si (KR); Nam Young Kim, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 493 days.

(21) Appl. No.: 15/370,028

(22) Filed: Dec. 6, 2016

(65) Prior Publication Data

US 2018/0001925 A1    Jan. 4, 2018

(30) Foreign Application Priority Data

Jun. 30, 2016  (KR) .......................... 10-2016-0082235

(51) Int. Cl.
 *B62D 6/00* (2006.01)
 *B62D 15/02* (2006.01)

(52) U.S. Cl.
 CPC ............. *B62D 6/00* (2013.01); *B62D 15/021* (2013.01)

(58) Field of Classification Search
 None
 See application file for complete search history.

(56) References Cited

U.S. PATENT DOCUMENTS

| | | | |
|---|---|---|---|
| 6,101,434 A * | 8/2000 | Irie | B60T 8/1755 180/197 |
| 9,393,995 B2 | 7/2016 | Banno et al. | |
| 2008/0054577 A1 * | 3/2008 | Horiuchi | B62D 6/02 280/5.522 |
| 2011/0029200 A1 * | 2/2011 | Shah | B62D 5/008 701/41 |
| 2012/0325574 A1 * | 12/2012 | Odate | B60R 22/46 180/282 |
| 2017/0113717 A1 * | 4/2017 | Ko | B62D 6/04 |

FOREIGN PATENT DOCUMENTS

| | | |
|---|---|---|
| JP | H06107202 A | 4/1994 |
| JP | 2010188977 A | 9/2010 |
| JP | 2010215191 A | 9/2010 |
| JP | 2015020440 A | 2/2015 |
| KR | 20110029823 A | 3/2011 |
| KR | 20130064542 A | 6/2013 |
| KR | 20140020500 A | 2/2014 |
| KR | 1020140081484 A | 7/2014 |
| KR | 20140104236 A | 8/2014 |
| KR | 101500172 B1 | 3/2015 |

* cited by examiner

*Primary Examiner* — John Olszewski
*Assistant Examiner* — Gerrad A Foster
(74) *Attorney, Agent, or Firm* — Slater Matsil, LLP

(57) ABSTRACT

The present invention relates to a method for controlling the position of a vehicle to ensure stable position of a vehicle against tilting due to a rapid change in vehicle speed. The method includes: determining whether a vehicle speed is rapidly changing in a straight direction on the basis of an extent of depression of a pedal that changes a position of a steering wheel and a change in vehicle speed; determining whether the vehicle is tilting on the basis of a change in a yaw-rate by means of the controller when the vehicle speed is rapidly changing in the straight direction; and providing compensation torque in the direction opposite the direction in which the vehicle is tilted by operating a steering motor when the controller determines that the vehicle is tilting.

20 Claims, 3 Drawing Sheets

METHOD FOR CONTROLLING POSITION OF VEHICLE

CROSS-REFERENCE TO RELATED APPLICATIONS

The present application claims priority to Korean Patent Application No. 10-2016-0082235, filed Jun. 30, 2016, the entire contents of which is incorporated herein for all purposes by this reference.

TECHNICAL FIELD

The present invention relates to a method for controlling the position of a vehicle.

BACKGROUND

A Motor-Driven Power Steering System (MDPS) supplements the steering force of a steering wheel using a motor and provides the advantage of increased fuel efficiency and simple control because it does not use the power from an engine, unlike the existing hydraulic power steering system.

The MDPS supplements the steering torque applied by a driver and provides steering force at all times while the vehicle is being driven. That is, a motor is controlled by an MDPS controller and power from the motor provides supplemental steering force for a driver, thereby reducing the fatigue of the driver.

Meanwhile, when a vehicle is driven straight with the steering angle of the steering wheel maintained at an on-center position, the vehicle is theoretically driven straight without tilting in any direction, but it may tilt in any one direction while it is driven due to a change in alignment, the slope of a road, or lateral wind.

In particular, when a vehicle rapidly changes speed such, as rapid acceleration, while it is driven straight, the vehicle is tilted due to slippage of the tires. However, it takes a long time and a lot of expense to analyze and fundamentally solve this problem, so there is a need for an additional solution.

The description provided above as a related art of the present invention is only for helping understanding the background of the present invention and should not be construed as being included in the related art known by those skilled in the art.

SUMMARY

Embodiments of the present invention present invention provide a method for controlling the position of a vehicle to secure stable position of a vehicle against inclination due to a rapid change in speed of the vehicle.

A method for controlling a position of a vehicle includes: a rapid vehicle speed change determination step of determining whether a vehicle speed is rapidly changing while traveling in a straight direction based on an extent of depression of a pedal that changes a position of a steering wheel and a change in vehicle speed by means of a controller; a tilting determination step of determining whether the vehicle is tilting from a compensation-entering condition based on a change in a yaw-rate by means of the controller when the vehicle speed is rapidly changing in the straight direction; and a compensation step of providing compensation torque in a direction opposite a direction of tilting of the vehicle by operating a steering motor when the controller determines that the vehicle is tilting.

In the rapid vehicle speed change determination step, it may be determined whether the vehicle runs straight based on a steering torque, a steering angle, and a steering angular speed.

In the rapid vehicle speed change determination step, it may be determined whether the vehicle is rapidly accelerating based on the vehicle speed and an extent of depression of an accelerator pedal.

In the tilting determination step, it may be further determined whether an absolute value of a difference in speed between left and right wheels is less than a reference value.

In the tilting determination step, it may be further determined whether an absolute value of a difference in speed between front and rear wheels is greater than a reference value.

In the tilting determination step, it may be further determined whether a vehicle position control system in the vehicle is operating.

In the tilting determination step, when a yaw-rate change is greater than a predetermined value, it is determined that the vehicle is tilting.

In the tilting determination step, when an absolute value of the yaw-rate change is greater than a reference value, it may be determined that the vehicle is tilting.

In the tilting determination step, it may be determined whether the vehicle is tilting based on whether the yaw-rate is a (−) value or a (+) value.

In the tilting determination step, it may be further determined whether an absolute value of the changed yaw-rate is maintained over the reference value for a reference time or more.

In the compensation step, compensation torque of the steering motor may be provided in proportion to the yaw-rate change.

The method may further include a compensation removal determination step of determining whether any one of compensation-removing conditions is satisfied based on an extent of depression of a pedal that changes the position of the steering wheel and the vehicle speed, after the compensation step.

In the compensation removal determination step, it may be determined whether to stop compensation based on any one of whether the vehicle position control system in the vehicle is operating, a steering torque, a steering angle, the extent of depression of an accelerator pedal, and the yaw-rate direction.

According to the present invention, when it is determined that a vehicle is tilting due to rapid acceleration, compensation torque is provided in the direction opposite the tilting direction of the vehicle by a steering motor of an MDPS, thereby preventing tilting of the vehicle, making it possible to improve drivability and stability in steering of the vehicle.

According to another embodiment of the present invention, a system for use with a vehicle comprises a vehicle speed sensor, a yaw-rate sensor, a steering motor, and a controller having inputs coupled to the vehicle speed sensor and the yaw-rate sensor and an output coupled to the steering motor. The controller configured to determine whether a vehicle speed is rapidly changing while traveling in a straight direction based on an extent of depression of a pedal that changes a position of a steering wheel and a change in vehicle speed, to determine whether the vehicle is tilting from a compensation-entering condition based on a change in a yaw-rate when the vehicle speed is rapidly changing in the straight direction, and to provide compensation torque in a direction opposite a direction of tilting of the vehicle by operating a steering motor when it is determined that the vehicle is tilting.

The system can further comprise a further sensor coupled to the controller. The further sensor comprises a sensor selected from the group consisting of a torque sensor, a shearing angle sensor, a wheel speed sensor, and an accelerator pedal sensor.

The system can further comprise a torque sensor coupled to the controller, a shearing angle sensor coupled to the controller, a wheel speed sensor coupled to the controller, and an accelerator pedal sensor coupled to the controller.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

Exemplary embodiments of the present invention will be described hereafter in detail with reference to the accompanying drawings.

A method for controlling the position of a vehicle according to an embodiment of the present invention includes a rapid vehicle speed change determination step, an inclination determination step, and a compensating step.

Figure 1:
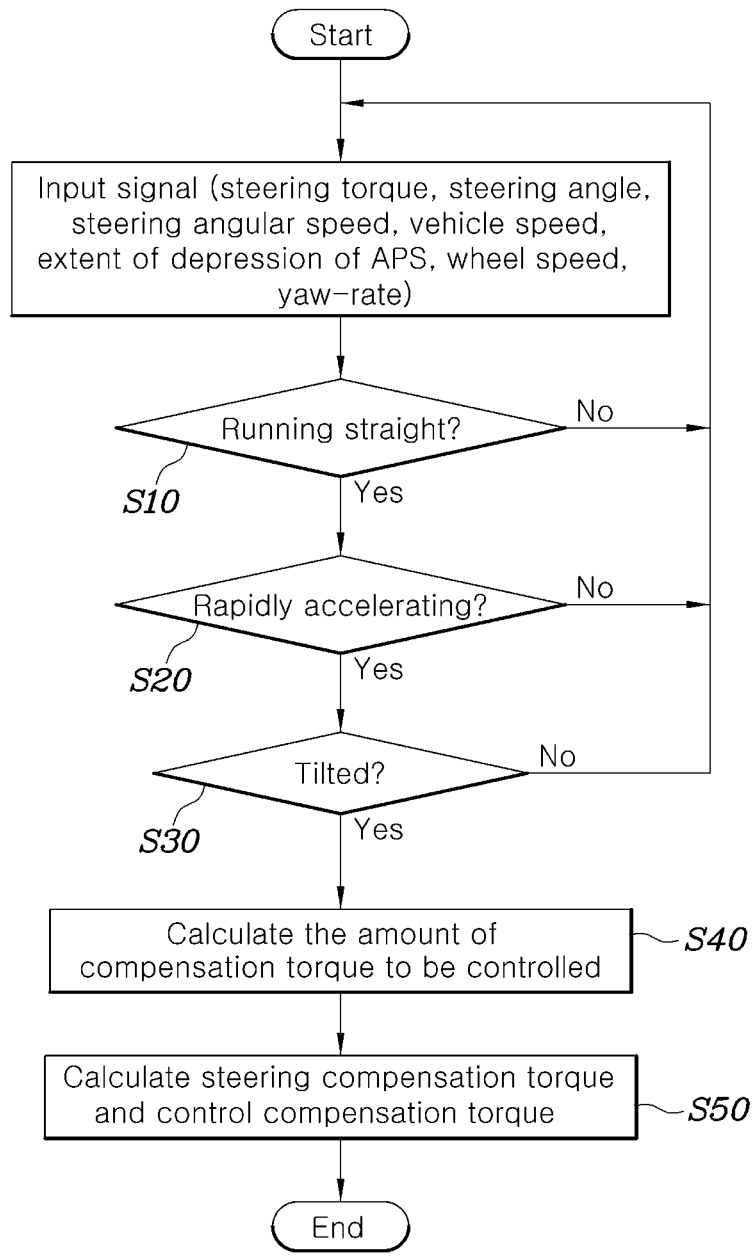
FIG. 1 is a view illustrating the flow of a method of controlling the position of a vehicle according to the present invention.
Figure 2:
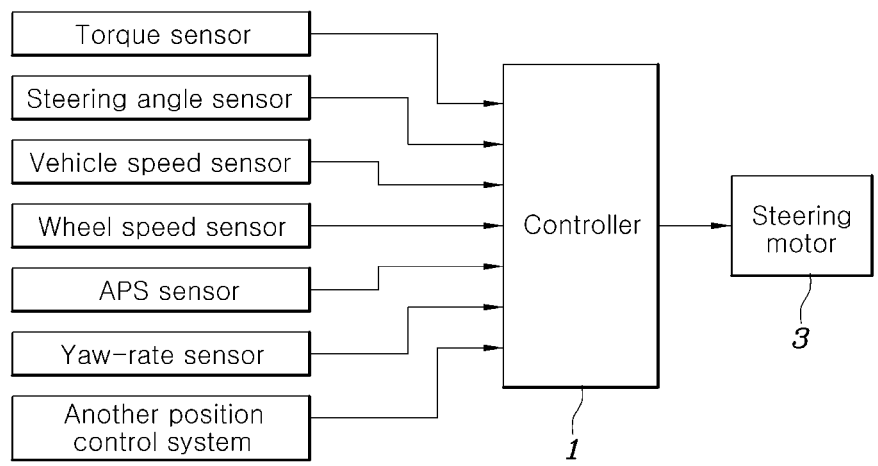
FIG. 2 is a schematic diagram showing a system for implementing the method for controlling the position of a vehicle according to an embodiment of the present invention.

Referring to FIGS. 1 and 2 to explain the present invention in detail, first, the rapid vehicle speed change determination step determines whether a vehicle speed is rapidly changing in a straight direction on the basis of the extent of depression of a pedal that changes the vehicle speed and the position of a steering wheel by means of a controller 1.

The controller 1 can be implemented using any number of circuits. For instance the controller can include a processor that executes program code stored in a non-transitory memory. In another example, the controller can be implemented using logic circuitry that implements, e.g. a state machine. The controller can be an application specific integrated circuit.

For example, in the rapid vehicle speed change determination step, it is possible to determine whether the vehicle runs straight on the basis of steering torque, a steering angle, a steering angular speed, and a vehicle speed.

The steering torque can be measured by a torque sensor and the steering angle and steering angular speed can be sensed by a steering angle sensor. When the absolute value of the steering torque is less than A Nm, the absolute value of the steering angle is less than B deg, and the absolute value of the steering angular speed is C deg/s, it is possible to determine that the vehicle is not running straight.

Further, in the rapid vehicle speed change determination step, it is possible to determine whether the speed of the vehicle is rapidly changing on the basis of the vehicle speed and the extent of depression of an accelerator pedal.

The vehicle speed can be measured by a vehicle sensor and the extent of depression of the accelerator pedal can be determined by an accelerator pedal sensor (APS), so when the vehicle speed is less than D kph and the extent of depression of the accelerator pedal is greater than E %, it is possible to determine that the vehicle is not rapidly accelerating.

Further, the tilting determination step can determine whether the vehicle is tilted from a compensation-entering condition based on a change in a yaw-rate by means of the controller 1 when the vehicle speed is rapidly changing while traveling in the straight direction as the result of the rapid vehicle speed change determination step.

That is, when the vehicle is rapidly accelerating in the straight direction, a change in yaw-rate is determined by a yaw-rate sensor, and whether the vehicle is tilted is determined on the basis of the change.

For example, when the yaw-rate change is greater than a predetermined value, it is possible to determine that the vehicle is tilting.

Preferably, when the absolute value of a change in yaw-rate is greater than F deg/s, which is a reference value, it is possible to determine that the vehicle is tilting.

Further, when the absolute value of the changed yaw-rate over the reference value is maintained for a reference time or more, it is possible to determine that the vehicle is tilting.

Further, it is possible to determine the tilting direction of the vehicle on the basis of whether the yaw-rate change direction is a (−) direction or a (+) direction.

That is, it is possible to determine that the vehicle is tilting left when the yaw-rate is less than −F deg/s, whereas it is possible to determine that the vehicle is tilting right when the yaw-rate is greater than F deg/s.

Further, in the tilting determination step, it is possible to further determine that the absolute value of the difference between the speeds of the left and right wheels is less than G kph, which is a reference value. The wheel speed can be input from a wheel speed sensor.

That is, when the absolute value of the difference between the speeds of the left and right driving wheels in particular is found to be less than the reference value while the vehicle is rapidly accelerating, compensation control to be described below is commenced, whereas, if it is the reference value or more, it is determined that one of the wheels excessively slips due to an abnormal state of a road (e.g., a road covered with snow or ice), in which case it is possible to avoid commencing compensation control.

Further, in the tilting determination step, it is possible to further determine whether the absolute value of the speed of front and rear wheels is greater than a reference value.

That is, when the absolute value of the difference between the speed of front and rear wheel while the vehicle is rapidly accelerating is greater than H kph, which is a reference value, compensation control, which will be described below, is commenced, while when it is the reference value or less, it is determined that the vehicle is not currently accelerating, in which case it is possible to avoid commencing compensation control.

Further, in the tilting determination step, it is possible to further determine whether or not a vehicle position control system in the vehicle is operating.

That is, when a vehicle position control system such as a vehicle stability management (VSM), a lane keeping assist system (LKAS), and a traction control system (TCS) in the vehicle is not currently operating, compensation control, to be described below, is commenced, or when the vehicle position control system is in operation, it is possible to avoid commencing compensation control.

Further, in the compensation step, when it is determined that the vehicle is tilting, the controller 1 can provide compensation torque in the direction opposite the tilting of the vehicle by operating a steering motor 3.

For example, in the compensation step, it is possible to provide compensation torque from the steering motor 3 in proportion to a change in yaw-rate.

That is, compensation torque is provided by operating the steering motor 3 of the MDPS in the direction opposite the tilting of the vehicle, in which the greater the change of yaw-rate, the greater the compensation torque from the steering motor 3, and the smaller the change of yaw-rate, the smaller the compensation torque from the steering motor 3.

It is possible to calculate the final amount of compensation torque control on the basis of a control coefficient set to correspond to a change in yaw-rate, or it is possible to calculate the final amount of compensation torque control by adjusting a gain value given to the steering motor 3.

Accordingly, by providing motor torque as much as the amount of the calculated compensation torque to be controlled by controlling the current of the steering motor 3, tilting of the vehicle is prevented.

Further, the method may further include a compensation removal determination step of determining whether any one of compensation-removing conditions is satisfied on the basis of the extent of depression of a pedal that changes the speed and on the position of the steering wheel and the vehicle speed, after the compensation step.

For example, in the compensation removal determination step, it is possible to determine whether to stop compensating on the basis of any one of whether the vehicle position control system in the vehicle is operating, and steering torque, a steering angle, the extent of depression of an accelerator pedal, and the yaw-rate direction.

That is, when any one of the cases of the absolute value of the steering torque being greater than 1 Nm, the absolute value of the steering angle being greater than J deg, the extent of depression of an APS being less than K %, a yaw-rate change being generated in the direction opposite the compensation start condition, and the vehicle position control system in the vehicle being operated is satisfied, compensation commencement logic is stopped.

The process of the method of controlling the position of a vehicle according to an embodiment of the present invention is described hereafter.

Referring to FIG. 1, it is determined whether a vehicle runs straight on the basis of input signals such as a steering torque, a steering angle, and a steering angular speed (S10).

For example, when the absolute value of the steering torque is less than A Nm, the absolute value of the steering angle is less than B deg, and the absolute value of the steering angular speed is C deg/s, it is possible to determine that vehicle is running straight.

When it is determined that the vehicle is running straight in step S10, it is determined that the vehicle is accelerating on the basis of input signals such as a vehicle speed, an extent of depression of an APS, and a wheel speed (S20).

For example, when the vehicle speed is less than D kph and the extent of depression of an accelerator pedal is greater than E %, it is possible to determine that the vehicle is accelerating. In this case, it is possible to further determine the absolute value of the difference of the speed between front and rear wheels, and when the absolute value of the difference of the speed between the front and rear wheels is greater than H kph, it is possible to determine that the vehicle is accelerating.

When it is determined that the vehicle is accelerating in step S20, it is possible to determine whether the vehicle is tilting on the basis of a yaw-rate input signal (S30).

For example, when the yaw-rate change is greater than a predetermined value, it is possible to determine that the vehicle is tilting.

Further, when the absolute value of the yaw-rate change is greater than F deg/s, it is possible to determine that the vehicle is tilting, in which case it is possible to determine the tilting direction on the basis of whether the yaw-rate is a (−) value or a (+) value.

However, when the difference in speed between left and right wheels is G kph or more or when the vehicle position control system, such as a TCS, an LKAS, or a VSM, is in operation even though it is determined that the vehicle is tilting, it is possible to avoid performing the compensating control to be described below.

Next, when it is determined that the vehicle is tilting in step S30, the amount of compensation torque control for eliminating the tilting of the vehicle is calculated (S40).

Then, compensation torque as much as the calculated amount of controlling compensation torque is provided by operating the steering torque 3 of the MDPS, thereby preventing tilting of the vehicle (S50).

The compensation torque can be controlled to be provided only one time, when the compensation-entering conditions are satisfied and the compensation logic is started.

Meanwhile, in the compensation control, when the absolute value of the steering torque is greater than I Nm, when the absolute value of the steering angle is greater than J deg, when the extent of depression of the accelerator pedal is smaller than K %, when yaw-rate is generated in the direction opposite the yaw-rate generation direction of the compensation-entering conditions, or when another position control system is operating, the compensation control can be stopped.

As described above, according to the present invention, when it is determined that a vehicle is tilting due to rapid acceleration, compensation torque is provided in the direction opposite the tilting direction of the vehicle by the steering motor 3 of the MDPS, thereby preventing tilting of the vehicle and making it possible to improve the drivability and stability in steering of the vehicle.

Figure 3A:
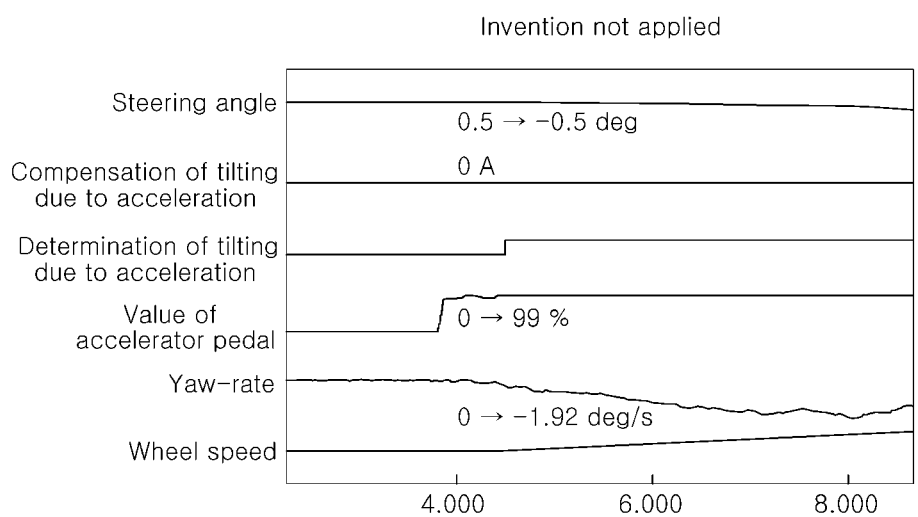
FIG. 3A is a diagram comparing test result data when the present invention is not applied.
Figure 3B:
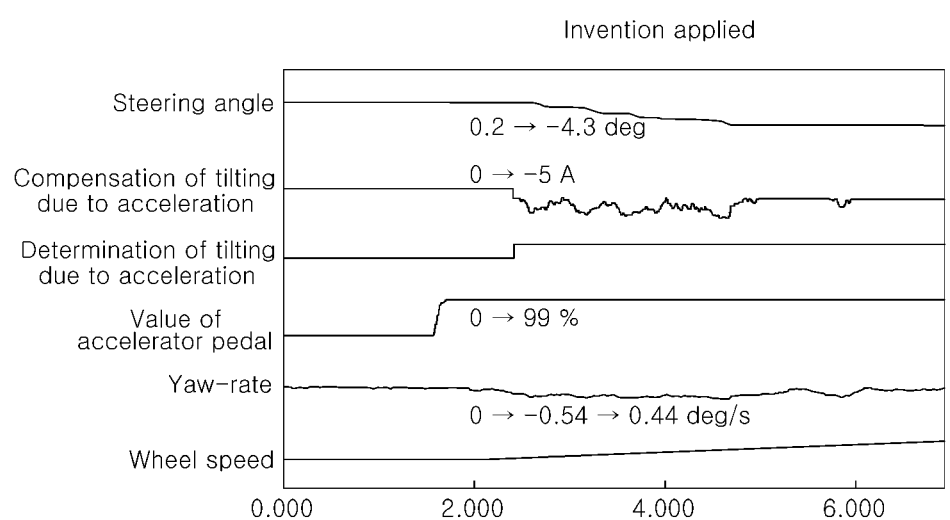
FIG. 3B is a diagram comparing test result data when the present invention is applied.

FIGS. 3A and 3B compare test data when the compensation logic of the present invention was not applied and test data when the compensation logic was applied while a vehicle was rapidly accelerated by fully pressing down the accelerator pedal (WOT) from a stopped state, and shows that the yaw-rate was decreased by about 70%, from −1.92 deg/s to 0.54 deg/s, when the compensation logic was applied, and accordingly, the tilting of a vehicle was remarkably reduced.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A method for controlling a position of a vehicle, the method comprising:
   obtaining input signal for determining whether the vehicle runs straight;

performing a vehicle speed change determination step of determining whether a vehicle speed is changing while traveling in a straight direction based on a position of a steering wheel and an extent of depression of an accelerator pedal that changes a change in vehicle speed;
performing a tilting determination step of determining whether the vehicle is tilting from a compensation-entering condition based on a change state in a yaw-rate when the vehicle speed is changing in the straight direction; and
performing a compensation step of providing compensation torque in a direction opposite a direction of tilting of the vehicle by operating a steering motor when it is determined that the vehicle is tilting;
wherein the vehicle speed change determination step and the tilting determination step are performed by a controller;
wherein the tilting determination step comprises determining that the vehicle is tilting when an absolute value of a yaw-rate change is greater than a reference value; and
wherein the tilting determination step further comprises determining whether an absolute value of the changed yaw-rate is maintained over the reference value for a reference time or more.

2. The method of claim 1, wherein the vehicle speed change determination step comprises determining whether the vehicle runs straight based on a steering torque, a steering angle, and a steering angular speed of a wheel of the vehicle.

3. The method of claim 1, wherein the vehicle speed change determination step comprises determining whether the vehicle speed is changing based on the vehicle speed and an extent of depression of the accelerator pedal.

4. The method of claim 1, wherein the tilting determination step further comprises determining whether the vehicle is tilting based on whether an absolute value of a difference in speed between left and right wheels is less than a reference value.

5. The method of claim 1, wherein the tilting determination further comprises determining whether the vehicle is tilting based on whether an absolute value of a difference in speed between front and rear wheels is greater than a reference value.

6. The method of claim 1, wherein the controller includes a vehicle position control system and the tilting determination step further comprises determining whether the vehicle position control system in the vehicle is operating.

7. The method of claim 1, wherein the tilting determination step comprises determining a tilting direction of the vehicle based on whether the yaw-rate is a negative value or a positive value.

8. The method of claim 1, wherein the compensation step comprises providing compensation torque of the steering motor in proportion to the yaw-rate change.

9. The method of claim 1, further comprising, after performing the compensation step, performing a compensation removal determination step of determining whether any one of compensation-removing conditions is satisfied based on the position of the steering wheel and an extent of depression of the accelerator pedal that changes the vehicle speed.

10. The method of claim 9, wherein the controller includes a vehicle position control system, and the compensation removal determination step comprises determining whether to stop compensation based on any one of whether the vehicle position control system in the vehicle is operating, a steering torque, a steering angle, the extent of depression of the accelerator pedal, and a yaw-rate direction.

11. A system for use with a vehicle, the system comprising:
a vehicle speed sensor;
a yaw-rate sensor;
a steering motor; and
a controller having inputs coupled to the vehicle speed sensor and the yaw-rate sensor and an output coupled to the steering motor, the controller configured to obtain an input signal for determining whether the vehicle runs straight, to determine whether a vehicle speed is changing while traveling in a straight direction based on a position of a steering wheel and an extent of depression of an accelerator pedal that changes vehicle speed, to determine whether the vehicle is tilting from a compensation-entering condition based on a change state in a yaw-rate when the vehicle speed is changing in the straight direction, and to provide compensation torque in a direction opposite a direction of tilting of the vehicle by operating the steering motor when it is determined that the vehicle is tilting;
wherein the controller is configured to determine that the vehicle is tilting when an absolute value of a yaw-rate change is greater than a reference value; and
wherein the controller is configured to determine whether an absolute value of the changed yaw-rate is maintained over the reference value for a reference time or more.

12. The system of claim 11, further comprising a further sensor coupled to the controller, the further sensor comprising a sensor selected from the group consisting of a torque sensor, a steering angle sensor, a wheel speed sensor, and an accelerator pedal sensor.

13. The system of claim 11, further comprising:
a torque sensor coupled to the controller;
a steering angle sensor coupled to the controller;
a wheel speed sensor coupled to the controller; and
an accelerator pedal sensor coupled to the controller.

14. The system of claim 11, wherein the controller comprises a processor that executes program code stored in a non-transitory memory.

15. A system for use with a vehicle, the system comprising:
a processor;
a non-transitory memory storing program code that, when executed by the processor, causes the processor to cause execution of a method comprising:
obtaining input signal for determining whether the vehicle runs straight;
performing a vehicle speed change determination step of determining whether a vehicle speed is changing while traveling in a straight direction based on a position of a steering wheel and an extent of depression of an accelerator pedal that changes a change in vehicle speed;
performing a tilting determination step of determining whether the vehicle is tilting from a compensation-entering condition based on a change state in a yaw-rate when the vehicle speed is changing in the straight direction; and
performing a compensation step of providing compensation torque in a direction opposite a direction of tilting of the vehicle by operating a steering motor when it is determined that the vehicle is tilting;

wherein the tilting determination step comprises determining that the vehicle is tilting when an absolute value of a yaw-rate change is greater than a reference value; and wherein the tilting determination step further comprises determining whether an absolute value of the changed yaw-rate is maintained over the reference value for a reference time or more.

16. The system of claim 15, wherein the vehicle speed change determination step comprises determining whether the vehicle runs straight based on a steering torque, a steering angle, and a steering angular speed of a wheel of the vehicle.

17. The system of claim 15, wherein the vehicle speed change determination step comprises determining whether the vehicle speed is changing based on the vehicle speed and an extent of depression of the accelerator pedal.

18. The system of claim 15, wherein the tilting determination step further comprises determining whether the vehicle is tilting based on whether an absolute value of a difference in speed between left and right wheels is less than a reference value.

19. The system of claim 15, wherein the tilting determination further comprises determining whether the vehicle is tilting based on whether an absolute value of a difference in speed between front and rear wheels is greater than a reference value.

20. The system of claim 15, wherein the compensation step comprises providing compensation torque of the steering motor in proportion to the yaw-rate change.

* * * * *